United States Patent [19]

Swartz

[11] Patent Number: 5,250,599
[45] Date of Patent: Oct. 5, 1993

[54] AQUEOUS AEROSOL COATING COMPOSITIONS

[75] Inventor: Andrew J. Swartz, Newtown, Pa.

[73] Assignee: Rohm and Haas Company, Philadelphia, Pa.

[21] Appl. No.: 738,009

[22] Filed: Jul. 30, 1991

[51] Int. Cl.$^5$ ............................................. C08K 5/06
[52] U.S. Cl. ........................................ 524/366; 524/378
[58] Field of Search ............................ 524/366, 378

[56] References Cited

U.S. PATENT DOCUMENTS

| | | | |
|---|---|---|---|
| 4,420,575 | 12/1983 | Rapaport et al. | 523/504 |
| 4,450,253 | 5/1984 | Suk | 524/378 |
| 4,578,415 | 3/1986 | Learner | 524/322 |

FOREIGN PATENT DOCUMENTS

| | | |
|---|---|---|
| 75094 | 3/1983 | European Pat. Off. |
| 175849 | 4/1986 | European Pat. Off. |
| 2085466 | 4/1982 | United Kingdom |

*Primary Examiner*—Joseph L. Schofer
*Assistant Examiner*—Jeffrey T. Smith
*Attorney, Agent, or Firm*—Marvin J. Powell

[57] ABSTRACT

An aqueous aerosol coating composition comprising a blend of neutralized acrylic dispersible polymer having a relatively high Tg, high acid number and low molecular weight, with a drying oil-modified, low molecular weight copolymer in a water-based carrier and propellant system which comprises dimethyl ether, water and a water-soluble organic solvent. Compositions containing the blend of this invention produce polymer coatings that possess improved drying time without adversely effecting other physical properties.

12 Claims, No Drawings

AQUEOUS AEROSOL COATING COMPOSITIONS

FIELD OF THE INVENTION

This invention relates to an aqueous aerosol coating composition and, more specifically, to an aqueous aerosol coating composition which possesses improved drying capability over current water-based systems. Coatings of this invention are particularly useful in water-based aerosol paint compositions.

BACKGROUND OF THE INVENTION

Aerosol paint compositions that employ volatile organic solvents as the carrier and propellant system for film-forming polymers are known and are in widespread use. However, the presence of organic solvents raise serious environmental concerns due to their toxic nature and create hazardous conditions in the workplace due to their highly flammable nature. While water-based aerosol paint compositions have had some impact in resolving the problems of toxicity and flammability, an inherent and continuing concern is the longer drying times for aqueous-based systems when compared to the faster drying organic solvent-based systems.

DESCRIPTION OF THE PRIOR ART

U.K. Patent No. 2,085,466A and published European Patent Application No. 68,771A (Equivalent U.S. Pat. No. 4,518,734), both describe a variety of polymers such as acrylics, alkyds, epoxy esters, and vinyl polymers and copolymers that can be used as the film-forming polymer in aqueous aerosol compositions. Both patents propose water-based aerosol paint formulations that use a mixture of dimethyl ether, water and a water-soluble solvent as the carrier and propellant system. The dimethyl ether-based propellant system is said to provide water-soluble polymers and water-dilutable emulsion polymers that are useful as film-forming polymers.

U.S. Pat. No. 4,450,253 describes a film-forming polymer which is a drying oil-modified acrylic ester polymer which is rendered water-soluble by neutralization with a volatile base, such as ammonia or an amine. This film-forming polymer is applied to a substrate by employing a single phase, water-based carrier and propellant system having dimethyl ether, water and water-soluble polar organic solvents. The patent claims to provide non-flammable aerosol paint compositions.

In U.S. Pat. No. 4,450,253, a Rohm and Haas Company product, Acrysol ® WS-24 acrylic dispersion resin is erroneously identified as an oil-modified acrylic acid ester that may be used as a film-forming polymer of that invention (Specification, column 6, lines 56 through 64). This is an erroneous identification of the chemical composition of this product.

Acrysol ® WS-24 acrylic dispersion resin is typically supplied at 36 percent solids in water and is not oil-modified. Also, it is not oil-modified in any variation of the invention as described in U.S. Pat. No. 4,450,253. Furthermore, there is no suggestion that an acrylic dispersion resin that has no oil modification can be employed as the film-forming polymer. However, a critical aspect of the invention as described in U.S. Pat. No. 4,450,253 is that the film-forming polymers of that invention must be drying oil-modified ester polymers which are solubilized and dissolved in the liquid phase propellant-solvent solution provided by the dimethyl ether, water and at least one polar solvent (Specification, column 5, lines 32 through 37). Acrysol ® WS-24 acrylic dispersion resin in not oil-modified. Consequently, the identification of Acrysol ® WS-24 acrylic dispersion resin as a drying oil-modified polymer was in error.

Additionally, there is no inference, no suggestion, no disclosure nor teaching in U.S. Pat. No. 4,450,253 that a blend of a non-oil-modified acrylic dispersion resin, with an oil-modified acrylic acid ester is useful in reducing the drying time of polymer films produced from aqueous-based aerosol systems.

U.S. Pat. No. 4,578,415 describes a drying oil-modified low molecular weight acrylic copolymer that is neutralized with ammonia or an amine to form the salt as the film-forming polymer. The introduction of the copolymer into the water-based propellant system having dimethyl ether, water and water-soluble solvents is said to provide a paint composition with improved storage stability.

U.S. Pat. No. 4,968,735 describes a dimethyl ether propelled water-based aerosol composition which employs thickeners that lose their thickening capability in the presence of dimethyl ether. However, upon evaporation of the dimethyl ether, the thickener regains its thickening capacity, thus producing high gloss, thick film aerosol paint formulations.

While aqueous-based carrier and propellant systems have made some improvements over organic solvent-based systems, further improvements in drying time as measured by set-time, dry-to-touch time and tack-free time are required.

It is therefore an object of the present invention to provide an aqueous aerosol coating composition with improved drying.

Another object of the present invention is to provide aqueous aerosol coating compositions with excellent stability when subjected to broad pH ranges.

Still another object of the present invention is to provide aqueous aerosol coating compositions with improved hardness.

It is still a further object of the present invention to provide aqueous aerosol coating compositions with equivalent gloss when compared to film polymers employing solvent-based systems.

SUMMARY OF THE INVENTION

The present invention provides a blend of a water-soluble salt of an acrylic dispersible polymer with an ammonium or amine salt of a drying oil-modified copolymer, dimethyl ether, water and a water-soluble organic solvent. Compositions containing the blend of this invention produce polymer films having faster drying times when compared to prior aqueous based systems. The improvement in drying time is obtained without adversely affecting other properties such as, for example, gloss, hardness and stability.

DETAILED DESCRIPTION OF THE INVENTION

The improved drying time for coatings made from the water-based aerosol system of the present invention results from the use of a blend of a water-soluble salt of a colloidal dispersible polymer, with a water-soluble ammonium or amine salt of an acrylate copolymer in a carrier and propellant active system having dimethyl ether, water and a water-soluble organic solvent to produce a coating with superior drying capability.

The water-soluble salt of the colloidal dispersible polymer of the present invention may have a Tg of from about 30 degrees centigrade to about 140 degrees centigrade, while the preferred Tg is about 45 degrees centigrade. It is believed that the Tg accelerates the hardness development in the film and increases the overall film hardness.

The average molecular weight of the water-soluble salt of the acrylic dispersible polymer is from about 20,000 to about 200,000, while the preferred molecular weight is from about 40,000 to about 50,000, as determined by gel permeation chromatography while using poly methyl methacrylate as the standard. It is believed that the low molecular weight of the acrylic dispersible polymer increases its compatibility with the water-soluble ammonium or amine salt of the drying oil-modified acrylate copolymer such that the coating produced therefrom has a shorter drying time and retains high gloss characteristics of the acrylate copolymer.

The acid number expressed as miligrams of potassium hydroxide divided by grams of polymer of the neutralized colloidal dispersible polymer is from about 30 to about 160. Rohm and Haas Company produces the acrylic dispersible polymer of the present invention under the trademark Acrysol® WS-24 acrylic dispersion resin. While it is possible to obtain Acrysol® WS-24 acrylic dispersion resin in the form of an amine salt, it is generally supplied unneutralized at 36 percent solids content in water. Other acrylic dispersion resins suitable for use in this invention are selected from the group consisting of Acrysol® WS-32, WS-50, WS-68, WS-78 Rhoplex® B-505, Rhoplex® NT-2426, and the like.

Whether the water-soluble salt of the acrylic dispersible polymer is specially prepared or is purchased commercially, it should be neutralized, at least in part, with ammonia, an alkyl amine or heterocyclic amine having up to 6 carbon atoms or with a mono-, di- or trialkanol amine having from 2 to about 6 carbon atoms in each alkanol moiety. An additional quantity of the neutralizing agent may also be present so that the final aerosol paint composition will have an alkaline pH, such as from about 7.5 to about 9.5. Suitable neutralizing agents include aqueous ammonium hydroxide, morpholine, triethanolamine, ethanolamine and the like.

The improvement in the drying capability of the water-based aerosol composition of the present invention arises from blending a water-soluble salt of an acrylic dispersible polymer with a water-soluble amine salt of the acrylate copolymer. It is believed that the nature of the acrylic dispersion resin offers unique properties to coatings produced therefrom. For instance, in its unneutralized state, the acrylic dispersion is believed to be a discrete latex particle, but when neutralized with a base, it swells and becomes solution-like in character, while still being composed of discrete particles. This unique behavior, in conjunction with its acid number, relatively high Tg and low molecular weight, is believed to impart coatings with accelerated drying capability. However, the true mechanism of this invention is unknown and the proffered explanation is not intended to in any way limit the scope of this invention in any manner whatsoever.

In order to blend the acrylic dispersible polymer and the drying oil-modified polymer, the drying oil-modified polymer must be neutralized and the viscosity reduced with water to prevent precipitation of the polymer. The neutralization can occur before or after the driers are added to the polymer but always before reduction with water. After water is added, the acrylic dispersible polymer can be blended in. If the above order of addition is not adhered to, blending is more difficult.

The weight ratio of the water-soluble salt of the acrylic dispersible polymer to the water-soluble ammonium or amine salt of a drying oil-modified, low molecular weight copolymer should be about 20/80 to 80/20, while the preferred weight ratio should be from about 40/60 to 60/40. When weight ratios are outside of the above ranges, the blends are less stable and the coatings are inferior.

The drying oil-modified, low molecular weight acrylate copolymer used in the present invention comprises copolymerized units of an alkyl acrylate of 3 to 5 carbon atoms and an alkyl methacrylate having 3 to 5 carbon atoms. Generally, the copolymer will comprise from about 10 percent to about 35 percent, preferably from about 15 percent to about 30 percent by weight of the alkyl acrylate, and from about 20 percent to about 70 percent, preferably from about 30 percent to about 60 percent by weight of the alkyl methacrylate based on the total weight of the copolymer composition. The preferred copolymers are from about 15 percent to about 30 percent butyl acrylate and from about 30 percent to about 60 percent isobutyl methacrylate by weight, based on the weight of the copolymer composition.

In addition, the copolymer composition comprises from about 10 percent to about 30 percent of a copolymerized drying oil such as linseed oil, soya oil, tung oil, safflower oil or other polyunsaturated oils, and from about 10 percent to about 20 percent based on the copolymer composition of a copolymerized, olefinically unsaturated acid or acid anhydride, such as acrylic acid, methacrylic acid, fumaric acid, itaconic acid, maleic acid and the like or an anhydride thereof. Suitably, the copolymer will have an average molecular weight of from about 300 to about 9,000, preferably from about 500 to about 3,000, most preferably from about 1,000 to about 2,000.

A drying oil-modified, low molecular weight copolymer of butyl acrylate and isobutyl methacrylate having a molecular weight of about 9,000, is produced by Rohm and Haas Company under the trademark designation Acryloid® WR-748 oil-modified copolymer. This oil-modified copolymer, or its substantial equivalent, is presently preferred for use in the present invention. Acryloid® WR-748 oil-modified copolymer is sold as a solution of the copolymer in an organic solvent such as isopropanol, propylene glycol propyl ether, usually at 60 percent solids, and is neutralized as described below to provide the water-soluble ammonium or amine salt thereof.

While it is possible to obtain the acrylate copolymer in the form of its amine salt, generally acrylate copolymers are available commercially in the unneutralized form. Whether the acrylate copolymer is specially prepared or is purchased commercially, the copolymer will be neutralized, at least in part, with ammonia, an alkyl amine or heterocyclic amine having up to 6 carbon atoms or with a mono-, di- or trialkanol amine having from 2 to about 6 carbon atoms in each alkanol moiety. An additional quantity of the neutralizing agent may also be present so that the final aerosol paint composition will have an alkaline pH such as from about 7.2 to about 10. Suitable neutralizing agents include aqueous ammonium hydroxide, morpholine, triethanolamine, ethanolamine and the like.

The water-soluble salt of the acrylate copolymer is present in an amount of from about 1 percent to about 60 percent, preferably from about 2 percent to about 40 percent by weight, based on the total weight of the aerosol paint composition.

The propellant-active carrier system employed in the present invention includes dimethyl ether, water and a water-soluble organic solvent. Dimethyl ether is a colorless, stable, polar liquid with a boiling point of minus 25 degrees centrigrade. Generally, the dimethyl ether will comprise from about 5 percent to about 60 percent, preferably from about 25 percent to about 50 percent by weight, based on the total weight of the aerosol paint composition. While it is preferred that the dimethyl ether is the sole propellant, under some circumstances from 0 percent to about up to 50 percent by weight of the dimethyl ether may be replaced by another liquid propellant, such as an aliphatic hydrocarbon or a fluorinated hydrocarbon. Further, a gaseous propellant may also be used, if desired, such as nitrogen, carbon dioxide, nitrous oxide and the like.

Water is present in the composition of the present invention in an amount of from about 10 percent to about 70 percent, preferably from about 20 percent to about 60 percent by weight of the total weight of the aerosol paint composition.

Also employed in the water-based aerosol paint composition of the present invention is a water-soluble organic solvent such as straight or branched chain monohydric alcohols of, for example, from 1 to about 6 carbon atoms, glycol ethers, esters, ketones and the like. Suitable organic solvents include methanol, ethanol, n-propanol, isopropanol, n-butanol, acetone, ethyl acetate, mono-alkyl ethers of ethylene, or propylene glycol having from one to about six carbon atoms in the alkyl moiety such as propylene glycol methyl ether, and ethylene glycol monobutyl ether, ethylene glycol monoalkyl acetates of 3 to about 6 carbon atoms in the alkyl moiety, such as ethylene glycol monobutyl ether acetate, diacetone alcohol and ester alcohols and the like. The water-soluble organic solvent will include a mixture of a low-molecular weight organic solvents such as an alkanol, alkyl ester or alkyl ketone containing from 1 to about 6 carbon atoms in the alkyl moiety with a higher molecular weight, water-soluble, polar organic solvent that acts as a coupling organic solvent such as the above-mentioned mono-alkyl ethers of ethylene or propylene glycol or the ethylene glycol mono-alkyl acetates. Generally, the water-soluble organic solvent will be present in an amount of from about 0.5 percent to 80 percent, preferably from about 0.5 percent to about 20 percent by weight based on the total weight of the composition.

The aerosol paint composition may also include a surfactant, pigment, pH stabilizer, antifoam agent, plasticizer, drying agents and the like. In general, there will be from 0 percent to about 20 percent, more usually from 0 percent to about 15 percent by weight based on the total weight of the composition of the pigment. Suitably, the other additives, when present, will not exceed about 3 percent by weight based on the total weight of the composition for each additive, and usually only up to about 1 percent or about 2 percent of each other additive will be present.

A blend of the water-soluble salt of an acrylic dispersible polymer with an ammonium or amine salt of a drying oil-modified, low molecular weight copolymer in a water-based carrier and propellant system having dimethyl ether, water and a water-soluble organic solvent provides paint compositions with the desired film-forming and drying properties that cannot be obtained when the drying oil-modified, low molecular weight copolymer is employed without the acrylic dispersible polymer. Coating properties are further enhanced when the drying oil-modified low molecular weight polymer undergoes air cure.

EXAMPLE 1

A white water-based aerosol paint composition was prepared and packaged in an aerosol can. The composition was prepared by mixing 60 parts by weight of the following paint formulation with 40 parts by weight of dimethyl either as the sole propellant.

| PAINT FORMULATION | PARTS |
|---|---|
| Rohm and Haas Acryloid WR-748 (60%) | 11.43 |
| Ammonium Hydroxide (28%) | 3.33 |
| Ethylene Glycol Monobutyl Ether | 8.33 |
| Isopropanol (99%) | 4.44 |
| Water | 40.14 |
| Titanium Dioxide | 11.11 |
| Cobalt Napthenate | 0.05 |
| Manganese Napthenate | 0.03 |
| Active-8 Drier (1.10 phenanthrolene) | 0.08 |
| Other additives | 1.23 |
| Rohm and Haas Acrysol WS-24 | 19.83 |
| TOTAL | 100.00 |

Acrysol ® WS-24 acrylic dispersible resin should be added last, or just before "Other additives". You cannot mix Acrysol ® WS-24 acrylic dispersion resin with Acryloid ® WR-748 oil-modified copolymer unless you neutralize and reduce viscosity of the drying oil-modified polymer.

Acryloid ® WR-748 drying oil-modified copolymer is a solution of 60+/−1 percent of the water reducible, butyl acrylate/isobutyl methacrylate copolymer in 50/50 percent by weight mixture of isopropyl alcohol and propylene glycol propyl ether.

A film was prepared with the above-mentioned paint formulation and was dried. The results are summarized in the Tables which follow.

TABLE I

| Tack-Free Times WR-748/WS-24 BLENDS | | |
|---|---|---|
| | Minutes to $T_o$ | Minutes to $T_{500}$ |
| WR-748 Control | 80 | 100 |
| WR-748/WS-24 (75/25) | 64 | 75 |
| WR-748/WS-24 (49/51) | 39 | 46 |
| WR-748/WS-24 (25/75) | 28 | 34 |

Tack-free time-By blending the Acrysol ® WS-24 acrylic dispersible resin with Acryloid ® WR-748 drying oil-modified copolymer, the time required for the film to dry was improved in each instance when compared to the control which contained only drying oil-modified copolymer.

TABLE II

| | TEST RESULTS | |
|---|---|---|
| Property | Control WR-748 | Blend WR-748 & WS-24 (49/51) |
| Hardness | 2B | HB |
| Gloss | 60° 85.4 | 60° 85.1 |
| | 20° 66.5 | 20° 73.4 |

TABLE II-continued

| | TEST RESULTS | |
|---|---|---|
| Property | Control WR-748 | Blend WR-748 & WS-24 (49/51) |
| Stability | Excellent 150 cps–164 cps slight separation | Excellent 220 cps–460 cps |

The improved drying time, as determined by tack-free time, was realized without a reduction in other physical properties; pencil hardness increased from 1 to 2 pencils; the gloss of the blend and control was equivalent; and the blend appeared to be more stable due to less of a tendency to separate.

TEST PROCEDURES

The following tests are employed to evaluate the physical properties of the cured film produced from the composition of this invention.

1. GLOSS-The 20 degree and 60 degree gloss were measured with gloss meters manufactured by the Gardner Instrument Company.

2. STABILITY-Heat stability is an accelerated aging test. Heat stability is determined by placing a sample of the paint formulation in a 2 ounce glass jar for (7) seven days at 140 degrees Fahrenheit. The viscosity of the sample is determined by a Brookfield viscometer.

3. ZAPON TACK TEST

Fabrication and Calibration of Tack Tester-A 1-inch (2.54 cm) wide strip of aluminum (0.00025 inches or 0.0064 cm thick) is cut and bent so that a 1-inch (2.54) square area will rest flat on a tack-free surface when a five gram weight is placed in the center of the area, but falls over with a lighter weight.

Testing for Zero Gram Zapon Tack Free-The tack tester is placed on the film with no additional weight on the 1 inch square area resting on the film, and restrained from falling over for five seconds as its weight presses down on the film. Then the tester is released. If it falls over within five seconds, the film passes the "zero gram Zapon test."

Testing for 500 Gram Zapon Tack Free-Similar to the zero gram test except that a 500 gram weight is placed in the center of the 1-inch square area for five seconds, pressing the tester on the film with additional force. The film passes if the tester falls over within five seconds after removing the weight.

4. TUKON HARDNESS-A 25 gram load is placed on the dried film by use of a diamond stylus. The indentation left on the film by the diamond stylus is measured under a microscope. The smaller the measured indentation, the harder the paint.

I claim:

1. An aqueous aerosol coating composition which comprises a blend of a water-soluble salt of an acrylic dispersible polymer with an ammonium or amine salt of a drying oil-modified copolymer in dimethyl ether, water and a water-soluble organic solvent.

2. The composition of claim 1 wherein the water-soluble salt of the acrylic dispersible polymer has a weight average molecular weight of about 20,000 to about 200,000, wherein the preferred range is from about 40,000 to about 50,000 as determined by gel permeation chromatography.

3. The composition of claim 2 wherein the water-soluble salt of the acrylic dispersible polymer has a Tg of about from 30 degrees centigrade to about 120 degrees centigrade, wherein the preferred range is from about 40 degrees centigrade to about 50 degrees centigrade.

4. The composition of claim 3 wherein the water-soluble salt of the acrylic dispersible polymer has an acid number from about 30 to about 160, wherein the preferred acid number is from about 80 to about 110.

5. The composition of claim 1 wherein the ratio of the water-soluble salt of the acrylic dispersible polymer to the ammonium or amine salt of the drying oil-modified copolymer is from about 20/80 to about 80/20, preferably from about 40/60 to about 60/40.

6. The composition of claim 5 wherein the ammonium or amine salt of the drying oil-modified copolymer comprises an alkyl acrylate having 3 to 5 carbon atoms and an alkyl methacrylate having 3 to 5 carbon atoms, with an average molecular weight from about 9,000, a preferred average molecular weight of from about 300 to about 9000, and a most preferred average molecular weight of from about 500 to about 3000 as determined by gel permeation chromatography.

7. The composition of claim 6 wherein the drying-oil modified copolymer comprises copolymerized units of from about 10 percent to about 35 percent of the alkyl acrylate, from about 30 percent to about 60 percent of the alkyl methacrylate, from about 20 percent to about 70 percent of an unsaturated carboxylic acid, and from about 10 percent to about 30 percent of a polyunsaturated drying oil by weight based on the weight of the copolymer.

8. The composition of claim 7 wherein the alkyl acrylate is from about 15 percent to about 30 percent and the alkyl methacrylate is from about 30 percent to about 60 percent by weight based on the weight of said copolymer.

9. The composition of claim 8 wherein the alkyl acrylate is butyl acrylate and the alkyl methacrylate is isobutyl methacrylate.

10. The composition of claim 1 comprising from 0 percent to 20 percent of a pigment and from 0 percent to 3 percent each of an additive selected from the group consisting of a surfactant, pH stabilizer, antifoam agent, plasticizer and drying agent, based on the total weight of the composition.

11. The composition of claim 10 wherein the pigment is from about 0 percent to 15 percent and the total weight of the additives do not exceed 3 percent, based on the total weight of the composition.

12. The composition of claim 10 wherein the total weight of the pigment is from about 0 percent to 20 percent and the total weight of an additive is from 0 percent to 3 percent, wherein the additive is selected from the group consisting of a surfactant, pH stabilizer, antifoam agent, plasticizer and drying agent, based on the total weight of the composition.

* * * * *